United States Patent
Bird et al.

(10) Patent No.: US 7,123,939 B1
(45) Date of Patent: Oct. 17, 2006

(54) COMMUNICATION STATION WITH AUTOMATIC CABLE LOSS COMPENSATION

(75) Inventors: John Bird, Huntington Station, NY (US); Leonid Kazakevich, Plainview, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 09/890,391

(22) PCT Filed: Dec. 23, 1999

(86) PCT No.: PCT/US99/30652

§ 371 (c)(1),
(2), (4) Date: Jul. 30, 2001

(87) PCT Pub. No.: WO00/46937

PCT Pub. Date: Aug. 10, 2000

Related U.S. Application Data
(60) Provisional application No. 60/118,824, filed on Feb. 5, 1999.

(51) Int. Cl.
*H04M 1/00* (2006.01)

(52) U.S. Cl. .................. 455/561; 455/422; 455/523
(58) Field of Classification Search ............ 455/14, 455/67.11, 249.1, 280, 291, 422, 523, 561
See application file for complete search history.

(56) References Cited

U.S. PATENT DOCUMENTS

| | | | | |
|---|---|---|---|---|
| 5,457,811 A | * | 10/1995 | Lemson | 455/67.11 |
| 5,502,715 A | | 3/1996 | Penny | |
| 5,548,820 A | * | 8/1996 | Victorin | 455/67.14 |
| 5,634,191 A | | 5/1997 | Beasley | |
| 5,737,687 A | | 4/1998 | Martin et al. | |
| 5,801,860 A | * | 9/1998 | Yoneyama | 398/94 |
| 5,826,179 A | * | 10/1998 | Lindenmeier et al. | 455/277.2 |
| 5,959,492 A | * | 9/1999 | Khoury et al. | 327/389 |
| 6,084,772 A | * | 7/2000 | Pell et al. | 361/699 |
| 6,205,189 B1 | * | 3/2001 | Ha | 375/345 |
| 6,269,255 B1 | * | 7/2001 | Waylett | 455/562.1 |
| 6,466,628 B1 | * | 10/2002 | Kim | 375/297 |

FOREIGN PATENT DOCUMENTS

EP    0442259    8/1991

* cited by examiner

*Primary Examiner*—Bing Q. Bui
(74) *Attorney, Agent, or Firm*—Volpe and Koenig, P.C.

(57) ABSTRACT

A wireless communications systems employing code-division multiple access information transmission techniques includes a transmission facility having ground-based transmission and reception electronic equipment, a remotely located RF power amplifier, an antenna, and an RF cable connecting the ground-based equipment with the remotely located RF power amplifier. Power level detectors in the ground-based equipment and in the remotely located RF power amplifier measure the signal level at each end of the RF cable. A microcontroller compares these measurements and adjusts a variable attenuator in the transmission signal path and a variable attenuator in the received signal path to compensate for signal level variability due to variations in signal loss.

16 Claims, 4 Drawing Sheets

COMMUNICATION STATION WITH AUTOMATIC CABLE LOSS COMPENSATION

This application is a 35 U.S.C. §371 national stage application of international application PCT/US99/30652, filed Dec. 23, 1999 which claims priority from U.S. provisional application No. 60/118,824, filed on Feb. 5, 1999.

BACKGROUND OF THE INVENTION

1. Field of the Invention

The present invention relates to wireless digital communications systems. More particularly, the present invention relates to a code-division multiple access (CDMA) communication system employing a base station having remotely located RF power amplification equipment.

2. Description of the Prior Art

CDMA systems provide an efficient use of the limited bandwidth of the RF spectrum, thereby permitting a greater amount of information transmission with less signal distortion than communications systems using other techniques, such as time division multiple access and frequency division multiple access.

In a CDMA communication system, an information signal at the transmitter is mixed with a pseudorandom spreading code which spreads the information across the entire bandwidth employed by the system. The spread signal is upconverted to an RF signal for transmission. A receiver, identified by the pseudorandom spreading code, downconverts the transmitted spread-spectrum signal and mixes this with the pseudorandom spreading code to reproduce the original information signal.

A prior art CDMA communication system is shown in FIG. 1. The communication system has a plurality of base stations $20_1$, $20_2$, ... $20_n$ connected together through land lines via a local public switched telephone network (PSTN) or by a wireless link. Each base station $20_1$, $20_2$, ... $20_n$ communicates using spread spectrum CDMA transmissions with mobile and field subscriber units stations $22_1$, $22_2$, ... $22_n$ located within its cellular area. Because a signal transmitted from one base station appears as noise to another base station, and thereby interferes with the ability of the second base station to receive transmissions from subscriber units located within its cellular area, it is desirable to carefully limit the amount of power transmitted from each base station $20_1$, $20_2$, ... $20_n$.

A CDMA base station typically has equipment such as an RF power amplifier and related electronics (not shown) located in a sheltered ground station for reception and transmission of RF signals and an antenna, or multiple antennae, mounted at some distance from the sheltered ground station. A significant amount of RF energy is lost through the cable connecting the ground station to the antenna. Accordingly, it is advantageous to colocate or integrate the RF amplifier and related electronics with the antenna. This arrangement results in cost savings and energy efficiency because it permits the use of a lower power RF amplifier than is necessary when the RF amplifier is located at a distance from the antenna. Although RF power is still lost in the cable which connects the ground station with the RF amplifier located at the antenna, far less power is lost than in the case where the RF amplifier is located in the ground station.

In order to control the amount of power transmitted at the antenna, the power loss through the cable must be measured and compensated. In addition, the power loss through the cable varies with temperature. This variability causes a variation in signal level to the RF amplifier, which can result in overpowering or underpowering the RF amplifier. Overpowering the RF amplifier can cause interference with neighboring cell sites and can cause distortion of the transmitted signal which produces additional undesirable noise. Underpowering the RF amplifier can result in the transmission of a signal that is too weak to effectively communicate with the subscriber units within the cell area of the transmitter.

U.S. Pat. No. 5,634,191 discloses an arrangement for a TDMA system for compensating for cable loss between separate communication system units. The transmit power level of the communication is quantized at the first communication unit and sent as data together with the communication signal to the second communication unit. At the second communication unit, the power level of the communication is again measured and compared to the quantized power level. A signal attenuator adjusts the communication power level at the second communication unit to be equivalent to the quantized power level.

The measurement of the power of an RF signal received by a base station is also critical to an effective CDMA system. Since this measurement is typically made at the ground station, variability in power loss through the cable also adversely affects the accuracy of the received power measurement.

Accordingly, there is a need for continuous, automatic compensation of the power loss in the cable between the antenna and the ground station in order to effectively control RF transmission power from the base station and more accurately to measure power received from subscriber units.

SUMMARY OF THE INVENTION

The present invention compensates for the variability of transmitted RF signal levels in a CDMA system where a cable connects ground-based low signal level RF equipment with remotely located RF power amplification equipment. The RF signal level is measured at the ground-based RF equipment end of the cable and also at the RF power amplifier equipment end of the cable. Changes in the loss across the cable are compensated with variable attenuators.

Accordingly, it is an object of the present invention to provide automatic cable loss compensation for a CDMA communication station having remotely located RF power amplification equipment.

Other objects and advantages of the present invention will become apparent after reading the detailed description of the presently preferred embodiment.

DESCRIPTION OF THE PREFERRED EMBODIMENTS

Figure 1:
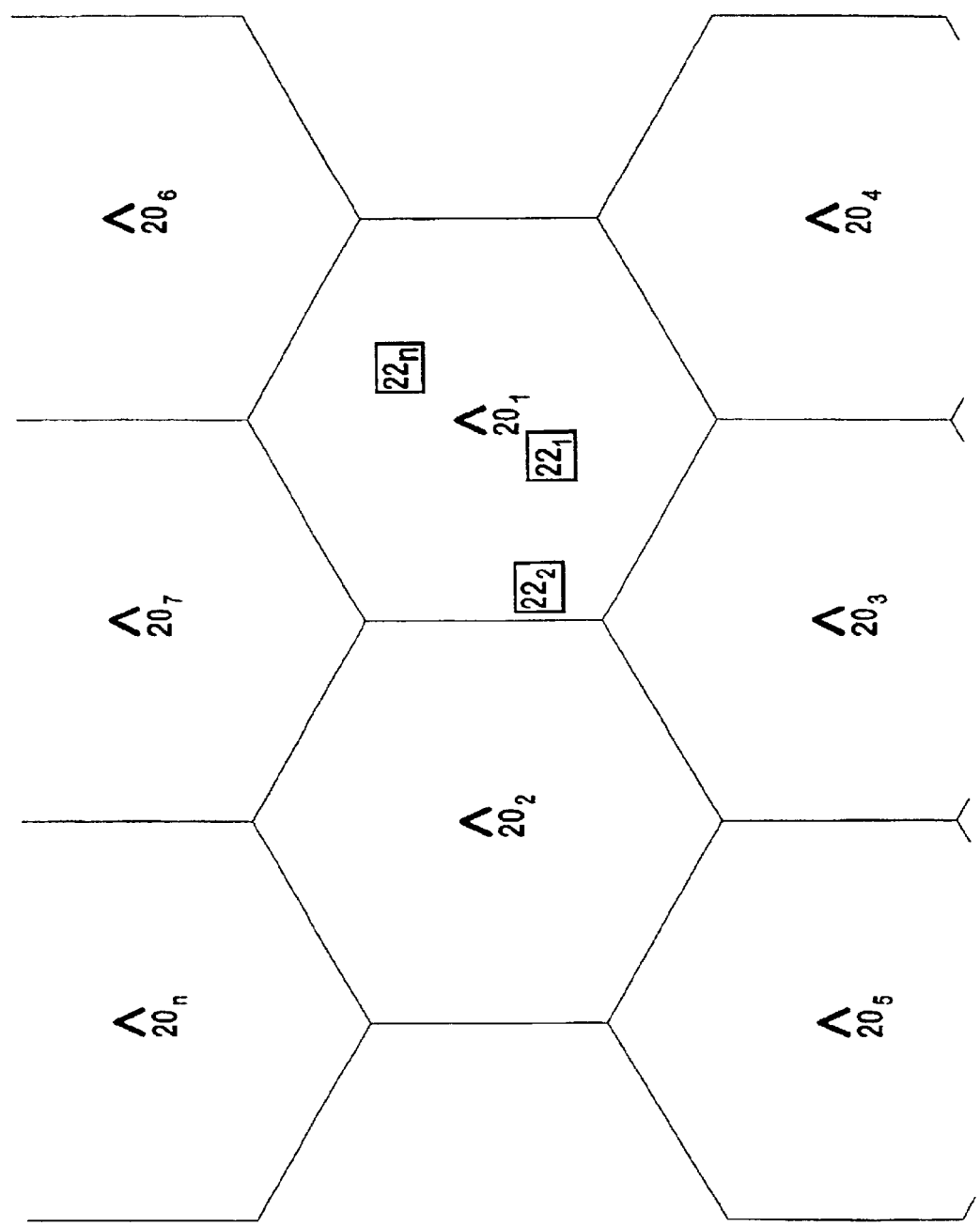
FIG. 1 is an illustration of a prior art CDMA system.

The preferred embodiments will be described with reference to the drawing figures where like numerals represent like elements throughout.

A communications network employing the present invention is shown in FIG. 1. The communications network includes a plurality of base stations $20_1, 20_2, \ldots 20_n$, each of which supports wireless communication with mobile and fixed subscriber units $22_1, 22_2, \ldots 22_n$ that are located within the coverage area of the respective base station $20_1, 20_2, \ldots 20_n$.

Figure 2:
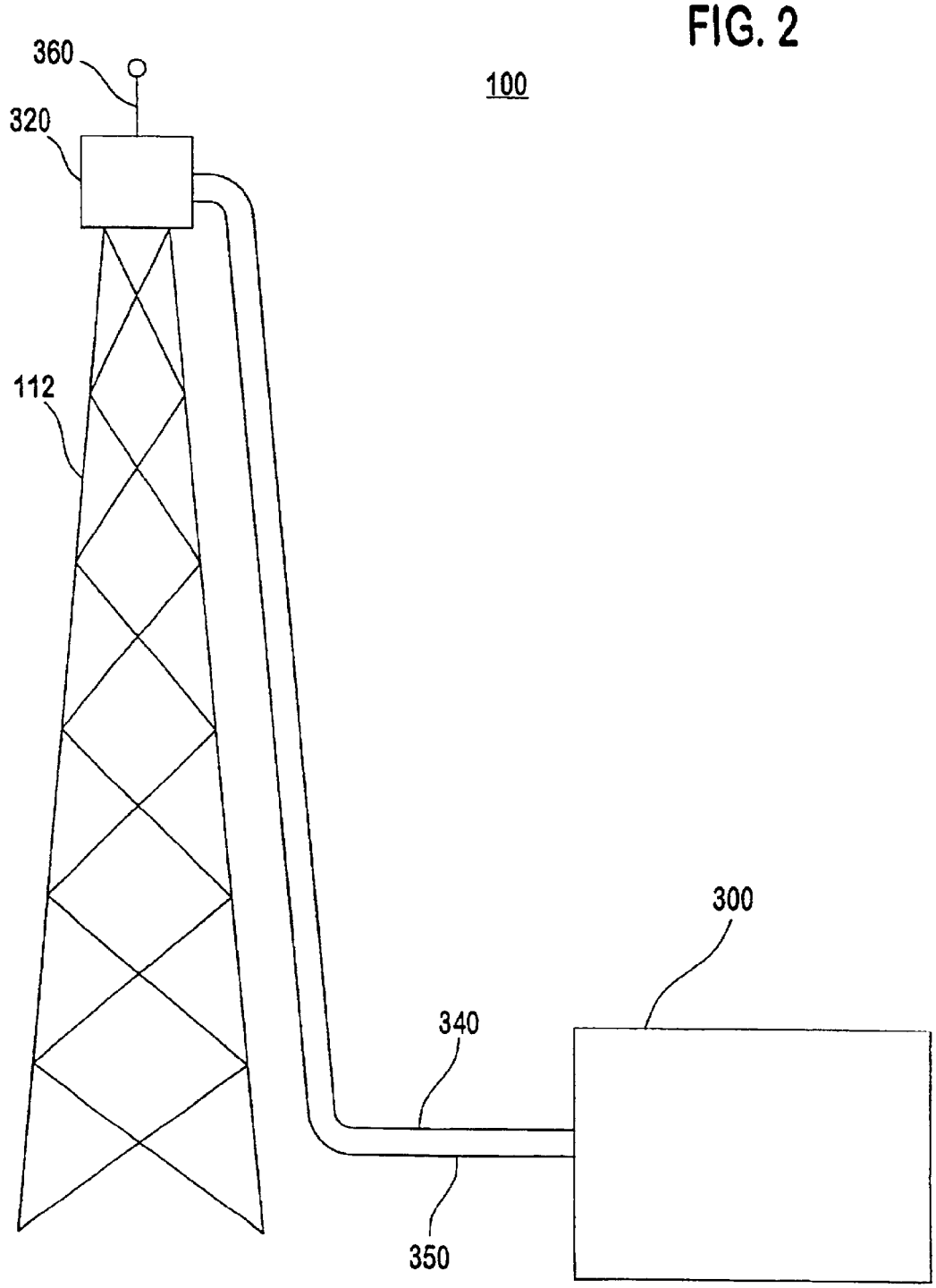
FIG. 2 is an illustration of a base station made in accordance with the present invention with an RF power amplifier located remotely from a ground station.

Referring to FIG. 2, a base station 100 with ground-based receiving and transmitting equipment 300, a remotely located mast head unit 320 and an antenna 360 mounted upon a tower 112 is shown. The mast head unit 320 includes an RF power amplifier and related electronics. A coaxial cable 340 conveys RF signals between the ground-based equipment 300 and the mast head unit 320. These signals include the incoming signals which are received from subscriber units $22_1, 22_2, \ldots 22_n$ at the antenna 360, processed by the mast head unit 320 and forwarded to the ground-based equipment 300; and the outgoing signals which are received by the ground-based equipment 300 forwarded to the mast head unit 320 and transmitted to the subscriber units $22_1, 22_2, \ldots 22_n$. A separate cable assembly 350 conveys amplifier prime power and control signals to and from the mast head unit 320.

Figure 3:
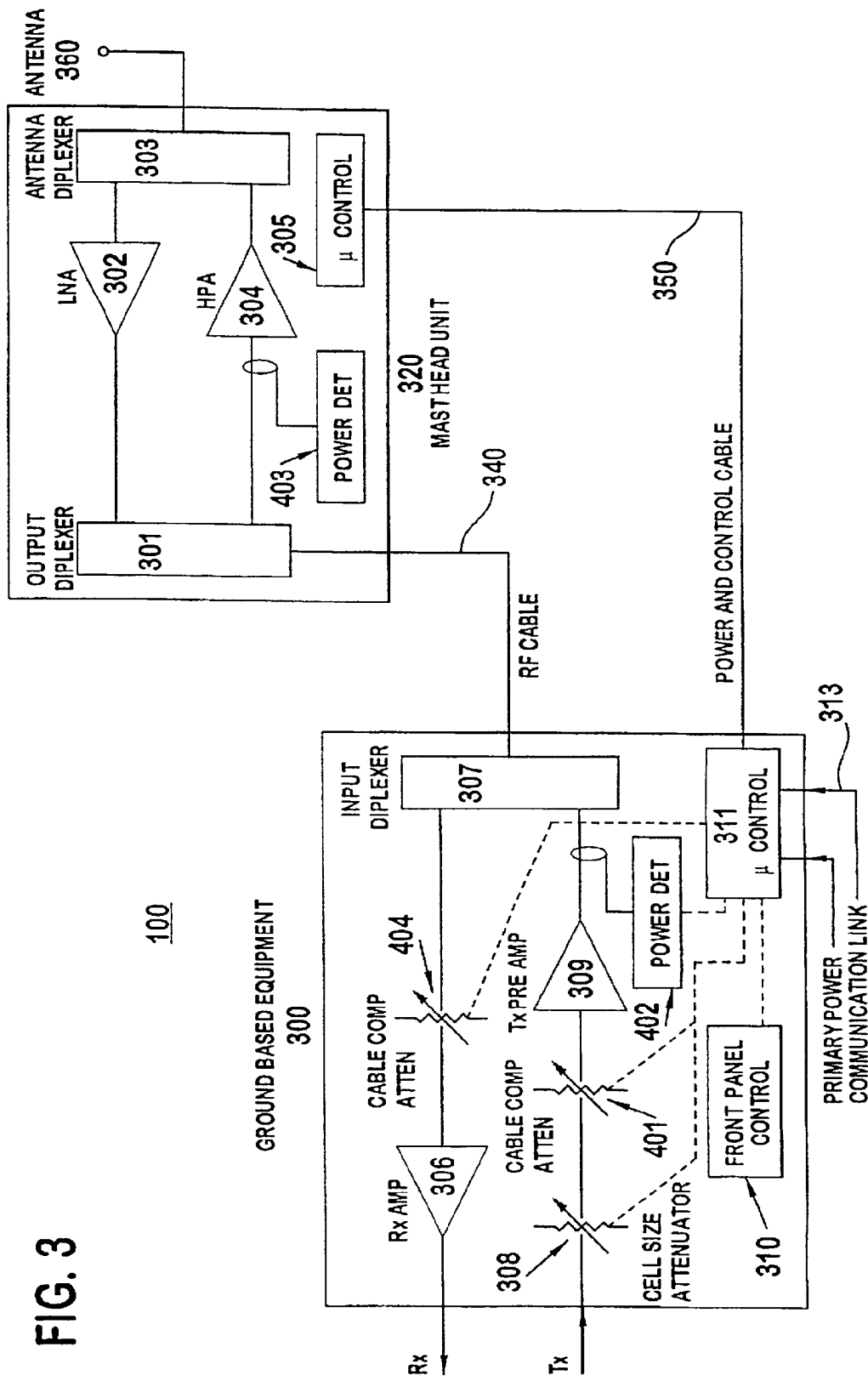
FIG. 3 is a block diagram of a CDMA ground station with remotely located RF power amplifier and antenna in accordance with the present invention.

A detailed schematic of a base station 100 with a remotely located RF power amplifier is shown in FIG. 3. The ground-based equipment 300 receives a signal to be transmitted (Tx), which has already been upconverted to the desired transmission frequency. An infinitely variable attenuator 308 adjusts the Tx signal level to limit power output as appropriate for the transmission area (cell size) of the base station 100. A touchpad front panel control 310 permits manual adjustment of the cell size attenuator 308. This adjustment is controlled by a microcontroller 311 which may also receive a command via a communications link 313 to provide remote adjustment of the cell size attenuator 308.

The level-adjusted Tx signal is level adjusted a second time by a variable cable compensation attenuator 401 and is buffered by a transmission preamplifier 309. A first power level detector 402 measures the power of the level adjusted Tx signal and the Tx signal is then forwarded through an input signal diplexer 307 to the RF cable 340. A diplexer allows bidirectional transmission of signals on a single cable. Thus, the input signal diplexer 307 and output signal diplexer 301 permit the level-adjusted Tx signal to be sent on the RF cable 340 while also simultaneously permitting reception of a level-adjusted received (Rx) signal from the mast head unit 320.

The Tx signal is sent through the RF cable 340 to an output diplexer 301 in the mast head unit 320. A second power level detector 403 in the mast head unit 320 measures the power of the signal to be transmitted after it has passed through the output diplexer 301. The signal is then amplified by a high power amplifier (HPA) 304 and routed through an antenna diplexer 303 for transmission by the antenna 360. Power for the electronics in the mast head unit 320 and other control signals are supplied from the ground-based equipment 300 by power and control cable 350.

A signal from a subscriber unit $22_1, 22_2, \ldots 22_n$ which is received at the antenna 360, is routed through the antenna diplexer 303 to a low noise amplifier (LNA) 302. The received (Rx) signal is amplified by the LNA 302 and routed through the output diplexer 301 and then is conveyed to the ground based equipment 300 through the RF cable 340. The Rx signal is stripped off the RF cable 340 by the input diplexer 307. The received signal is level adjusted by a second variable cable compensation attenuator 404 and then buffered by an amplifier 306 and routed to downconverter equipment (not shown).

A microcontroller 305 in the mast head unit 320 sends the power measurement made at the second power level detector 403 to the microcontroller 311 in the ground-based equipment 300. The microcontroller 311 in the ground-based equipment 300 compares the power level measured at the output of the transmission pre-amplifier 309 with the power level measured at the input to the high power amplifier 304 in the mast head unit 320. The microcontroller 311 then adjusts the first variable cable attenuator 401 to maintain a constant power level at the input to the high power amplifier 304, and makes an identical adjustment to the second infinitely variable cable attenuator 404 to compensate for the effect of variable cable loss on the received signal. The control system comprising ground-based power level detector 402, mast head unit power level detector 403, the first and second variable cable attenuators 401, 404, mast head microcontroller 305, and ground-based unit microcontroller 311 provides a continuous automatic adjustment for the variable loss associated with the RF cable 340.

An alternate embodiment of the invention combines cell size attenuator 308 with cable compensation attenuator 401, whereby the attenuation range of the combined attenuator is sufficiently large to accommodate the range required by both of the attenuators 308, 401.

Figure 4:
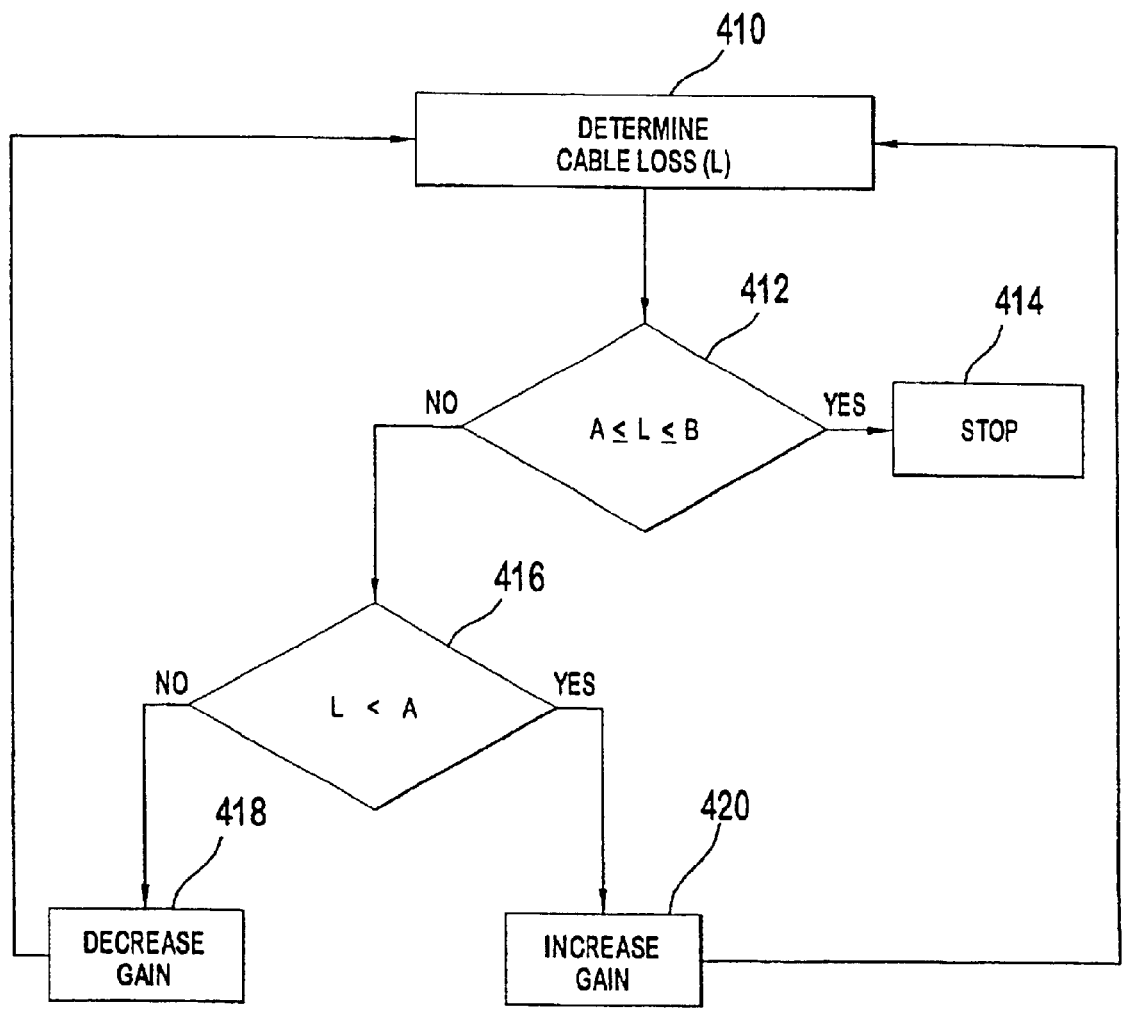
FIG. 4 is a flow diagram of a method for adjusting cable compensation attenuators in accordance with the present invention.

FIG. 4 shows the procedure 400 for cable loss compensation 400 which adjusts cable compensation attenuators 401, 404 in accordance with the present invention. The cable compensation method 400 is designed to adjust cable loss to between a predetermined lower limit, (A), and a predetermined upper limit, (B). In this procedure 400, cable loss includes the effect of the first cable compensation attenuator 401. At step 410, a measurement of cable loss (L) is made by comparing the RF power level measured at the first power detector 402 with the RF power level measured at the second power level detector 403. At step 412, cable loss L is compared to predetermined limits lower and upper limits A and B respectively. If the cable loss L is between lower limit A and upper limit B, or is equal to either limit, then no further adjustment is made and the cable loss compensation procedure terminates at block 414. If the cable loss L is either higher than upper limit B or lower than lower limit A, then a further comparison is made a step 416. At step 416, a determination is made whether the cable loss L is lower than lower limit A. If so, then the gain of the cable attenuators 402, 403 is decreased, as shown at step 420. If the cable loss L is not lower than lower limit A, it must be higher than upper limit B, and the gain of the cable attenuators 402, 403 is increased as shown at step 418. Upon completion of an increase or decrease of cable loss compensator gain at step 418 or 420, cable loss L is again measured at block 410. This procedure is repeated until cable loss L is brought within the predetermined limits A, B and the compensation procedure terminates at step 414. The cable compensation procedure 400 may be performed on a repeated basis at a rate which is appropriate for maintaining constant output power under conditions which cause cable loss L to fluctuate.

Although the invention has been described in part by making detailed reference to certain specific embodiments, such details is intended to be instructive rather than restrictive. Although the invention has been described in the preferred embodiment for use in a CDMA communication system, it is equally applicable to other types of communication systems such as Timed Division Duplex (TDD), Frequency Division Duplex (FDD), Multimedia Distribution System (MDS), Local Multipoint Distribution Systems (LMDS), Unlicense National Information Infrastructure/ National Information Infrastructure (UNII/NII), next generation and other cellar radio communication systems. It will be appreciated by those skilled in the art that many variations may be made in the structure and mode of operation without departing from the spirit and scope of the invention as disclosed in the teachings herein.

What is claimed is:

1. An attenuation compensation system for use in a base station having a mast head unit remotely connected to ground-based equipment by a cable, whereby a signal sent from said ground-based equipment to said mast head unit experiences attenuation, the system comprising:

at said ground-based equipment (300):
   a first power level detector (402) coupled to a transmit signal line for outputting a first power level signal;
   a compensation attenuator (401) coupled to the transmit signal line;
   at least one controller for controlling the compensation attenuator (401); and
   at said mast head unit (320):
   a second power level detector (403) coupled to the transmit signal line for outputting a second power level signal, said second power level detector having means for transmitting the second power level signal to said ground-based equipment; said second power level signal being based upon the amount of said attenuation;
   whereby said controller (301) compares said first and second power level signals and controls the compensation attenuator (401) accordingly.

2. The attenuation compensation system as recited in claim 1 further comprising a second compensation attenuator (404) coupled to a receive signal line.

3. The attenuation compensation system as recited in claim 2 wherein the controller (311) controls the second compensation attenuator (404).

4. The attenuation compensation system as recited in claim 2 further comprising a first diplexer (307) located in the ground-based equipment and coupled to the receive signal line, the transmit signal and the cable.

5. The attenuation compensation system as recited in claim 2 further comprising a second diplexer (301) located in the mast head unit and coupled to the receive signal line, the transmit signal line and the cable.

6. The attenuation compensation system as recited in claim 2 wherein the mast head unit further comprises a low noise amplifier (302) coupled to the receive signal line.

7. The attenuation compensation system as recited in claim 2 wherein the mast head unit further comprises an antenna diplexer (303) coupled to an antenna (360), the transmit signal line, and the receive signal line.

8. The attenuation compensation system as recited in claim 1 further comprising a power and control cable (350) connected between the mast head unit and the ground-based equipment for carrying control signals between the first and second power level detectors (402, 403).

9. The attenuation compensation system as recited in claim 1 wherein the ground-based equipment further comprises a cell size attenuator (308) coupled to the transmit signal line.

10. The attenuation compensation system as recited in claim 1 wherein the ground-based equipment further comprises a transmit pre-amplifier coupled (309) to the transmit signal line.

11. The attenuation compensation system as recited in claim 1 wherein the mast head unit further comprises a high power amplifier (304) coupled to the transmit signal line.

12. A method of compensating for cable loss in a wireless communication system having a high power amplifier (304) located proximate an antenna, a pre-amplifier (309) receiving a transmit signal located at a remote location, and a cable (340) connected between the amplifiers, the method comprising the steps of:

detecting a first power level of the transmit signal at an output of the pre-amplifier (309);
   detecting a second power level of the transmit signal at an input of the high power amplifier (304);
   feeding back the second power level from said proximate location to said remote location;
   comparing, at said remote location, the first and second power levels to determine a loss in the cable;
   adjusting a compensation attenuator (401) coupled to the pre-amplifier based upon the loss.

13. The method of compensating for cable loss as recited in claim 12 wherein a gain of the cable compensation attenuator (401) is decreased if the loss is below a lower limit.

14. The method of compensating for cable loss as recited in claim 12 further comprising the steps of:

comparing the loss to upper and lower limits;
   maintaining the gain of the cable compensation if the loss is between the limits;
   decreasing the gain of the cable compensation if the loss is below the lower limit; and,
   increasing the gain of the cable compensation if the loss is above the upper limit.

15. The method of compensating for cable loss as recited in claim 12 further comprising adjusting the gain of a second cable compensation attenuator (404) coupled to a receive signal based upon the loss.

16. An attenuation compensation system for use in a base station having at least one cable extending between first and second locations, the system comprising:

power level detection means for determining transmit signal power level at said first location and at said second location;
   feed back means for feeding back the transmit signal power level from said second location to said first location;
   comparing means at the first location for comparing power levels from the power level detection means and for determining a loss between the two locations;
   attenuating means at the first location for controlling the power level of the transmit signal; and,
   control means at the first location responsive to the comparing means for controlling the attenuating means.

\* \* \* \* \*

UNITED STATES PATENT AND TRADEMARK OFFICE
CERTIFICATE OF CORRECTION

| | | |
|---|---|---|
| PATENT NO. | : 7,123,939 B1 | Page 1 of 1 |
| APPLICATION NO. | : 09/890391 | |
| DATED | : October 17, 2006 | |
| INVENTOR(S) | : Bird et al. | |

It is certified that error appears in the above-identified patent and that said Letters Patent is hereby corrected as shown below:

At column 2, line 1, after the word "compensated", insert --for--.

At column 2, line 14, before the words "at the", delete "quantized" and insert therefor --quantified--.

At column 2, line 18, after the words "to the", delete "quantized" and insert therefor --quantified--.

At column 2, line 21, after the words "to the", delete "quantized" and insert therefor --quantified--.

At column 2, line 29, after the word "compensation", delete "of" and insert therefor --for--.

At column 2, line 42, after the word "compensated", insert --for--.

At column 4, line 44, after the word "made", delete "a" and insert therefor --at--.

At column 4, line 62, after the word "details", delete "is" and insert therefor --are--.

At column 5, line 2, before the word "National", delete "Unlicense" and insert therefor --Unlicensed--.

Signed and Sealed this

First Day of May, 2007

JON W. DUDAS
*Director of the United States Patent and Trademark Office*